(12) United States Patent
Gray

(10) Patent No.: US 12,404,185 B2
(45) Date of Patent: Sep. 2, 2025

(54) PROCESS, SYSTEM, AND COMPUTER READABLE STORAGE MEDIUM FOR DETERMINING OPTIMAL COAGULANT DOSAGE

(71) Applicant: HACH COMPANY, Loveland, CO (US)

(72) Inventor: Matthew Gray, Lafayette Hill, PA (US)

(73) Assignee: HACH COMPANY, Loveland, CO (US)

( * ) Notice: Subject to any disclaimer, the term of this patent is extended or adjusted under 35 U.S.C. 154(b) by 591 days.

(21) Appl. No.: 17/609,592

(22) PCT Filed: Sep. 24, 2021

(86) PCT No.: PCT/US2021/051853
§ 371 (c)(1),
(2) Date: Nov. 8, 2021

(87) PCT Pub. No.: WO2022/108659
PCT Pub. Date: May 27, 2022

(65) Prior Publication Data
US 2023/0257283 A1    Aug. 17, 2023

Related U.S. Application Data

(60) Provisional application No. 63/132,162, filed on Dec. 30, 2020, provisional application No. 63/115,320, filed on Nov. 18, 2020.

(51) Int. Cl.
C02F 1/00    (2023.01)

(52) U.S. Cl.
CPC ........ C02F 1/008 (2013.01); C02F 2209/001 (2013.01); C02F 2209/02 (2013.01);
(Continued)

(58) Field of Classification Search
CPC ...... C02F 1/008; C02F 1/52; C02F 2209/001; C02F 2209/02; C02F 2209/04;
(Continued)

(56) References Cited

U.S. PATENT DOCUMENTS 6,408,227 B1    6/2002 Singhvi et al.

FOREIGN PATENT DOCUMENTS

| CN | 102531121 A |   | 7/2012 |          |
|----|-------------|---|--------|----------|
| CN | 110188945 A | * | 8/2019 | C02F 9/00 |

(Continued)

OTHER PUBLICATIONS

KR 101334693 B1, English machine translation, pp. 1-9 (Year: 2013).*

(Continued)

*Primary Examiner* — Claire A Norris
(74) *Attorney, Agent, or Firm* — Oliff PLC

(57) ABSTRACT

A method, system, and computer readable storage medium for determining an optimal amount of coagulant to be added to water for coagulation treatment. The method includes predicting a water quality index that would be achieved for a corresponding nominal coagulant dose by evaluating at least one coagulation-related incoming water parameter of water that has not been treated with coagulant, with a first mathematical model constructed from historical data including (i) previously administered coagulant dosages; and (ii) previously determined values of the water quality index of the water. The method also includes determining whether the predicted water quality index is within a target range. If the predicted quality index is not within the target range, then the coagulant dosage can be adjusted, and the adjusted dosage can be evaluated to predict the water quality index that would be achieved if the adjusted coagulant dosage is administered to the water.

16 Claims, 4 Drawing Sheets

(52) U.S. Cl.
CPC .... *C02F 2209/04* (2013.01); *C02F 2209/055* (2013.01); *C02F 2209/06* (2013.01); *C02F 2209/11* (2013.01); *C02F 2209/20* (2013.01); *C02F 2209/40* (2013.01)

(58) Field of Classification Search
CPC ............ C02F 2209/05; C02F 2209/055; C02F 2209/06; C02F 2209/11; C02F 2209/20; C02F 2209/40
USPC .......................................................... 210/739
See application file for complete search history.

(56) References Cited

FOREIGN PATENT DOCUMENTS

| CN | 111268780 A | * | 6/2020 | ................ C02F 1/52 |
| KR | 101334693 B1 | * | 12/2013 | |

OTHER PUBLICATIONS

Sun, CN 110188945 English machine translation (Year: 2019).*
Zhang et al, CN 11268780, English machine translation (Year: 2020).*
Ratnaweera et al., "State of the Art of Online Monitoring and Control of the Coagulation Process." Water, vol. 7, pp. 6574-6597, 2015.
Yu et al., "Application of artificial neural network to control the coagulant dosing in water treatment plant." Water Science and Technology, 42(3-4), 2000, Abstract.
Baba et al., "Intelligent Support System for Water and Sewage Treatment Plants Which Includes a Past History Learning Function—Coagulant Injection Guidance System Using Neuralnet Algorithm." Instrumentation, Control and Automation of Water and Wastewater Treatment and Transport Systems, 1990, Abstract.
Song et al., "Research on prediction model of optimal coagulant dosage in water purifying plant based on nerual network." 2009 ISECS International Colloquium on Computing, Communication, Control, and Management, 2009, Abstract.

* cited by examiner

PROCESS, SYSTEM, AND COMPUTER READABLE STORAGE MEDIUM FOR DETERMINING OPTIMAL COAGULANT DOSAGE

This application claims the benefit of priority to: (i) U.S. Provisional Application No. 63/132,162, filed Dec. 30, 2020, and (ii) U.S. Provisional Application No. 63/115,320, filed Nov. 18, 2020. The disclosure of the prior applications is hereby incorporated by reference herein in its entirety.

BACKGROUND

The purification of water to remove insoluble organic and/or unwanted particles is important for many applications, such as the treatment of feeds, waste water streams, process streams and by-products associated with various industrial processes, the provision of safe potable drinking water, and the treatment and control of municipal and industrial wastewater. Coagulation is a water treatment technique typically applied prior to filtration to enhance the ability of a treatment process to remove particles from the water. Coagulation involves administering a coagulant to the water to neutralize charges keeping particles apart and cause the particles to aggregate to form a floc or precipitate, which can then be allowed to settle out of suspension and can then be filtered from the water.

Coagulation is a complex process which is influenced by several variables, such as turbidity, temperature, pH, alkalinity, organics, dosage, and coagulant type. Current simplistic techniques do not fully account for the interaction between the variables that influence coagulation. Due to the complex mechanism and multiple variables influencing coagulation, it is difficult to develop an accurate deterministic model of the coagulation process for determining the optimal amount of coagulant and there is no such widely accepted process model applicable to most situations. In almost all cases, an excess of coagulant is administered to the water, which wastes coagulant and increases operating costs both in terms of coagulant costs and sludge treatment control because of increased quantities of sludge generated. On the other hand, coagulant under-dose can also occur, which may not remove turbidity sufficiently to meet regulatory requirements.

There remains a need for improved methods and systems that implement an optimal amount of coagulant for achieving maximum coagulation effect without wasting coagulant and increasing operating cost.

SUMMARY

In one aspect, the disclosure provides a method for determining an optimal amount of coagulant to be added for coagulation treatment. The method includes predicting a water quality index that would be achieved for a corresponding nominal coagulant dosage by evaluating at least one coagulation-related incoming water parameter of water that has not been treated with coagulant, with a first mathematical model that has been constructed from historical data including (i) previously administered coagulant dosages; and (ii) previously determined values of the water quality index of water that has been treated with the previously administered coagulant dosages, and determining whether the predicted water quality index is within a target range. If the predicted water quality index is not within the target range, then the nominal coagulant dosage can be adjusted, and the adjusted coagulant dosage can be evaluated with the first mathematical model to predict the water quality index that would be achieved for the adjusted coagulant dosage.

In another aspect, the disclosure provides a coagulation treatment system. The system can include a conduit through which water can flow, a memory configured to store at least the first mathematical model, and a controller configured to: predict a water quality index that would be achieved if a nominal coagulant dosage is administered to the water based on the first mathematical model, and determine whether the predicted water quality index is within a target range. If the water quality index is not within the target range, the controller can also be configured to adjust the nominal coagulant dosage and repeat the predicting and determining functions.

In a further aspect, the present disclosure provides a non-transitory computer readable storage medium having stored therein a program to be executable by a processor. The program can cause the processor to execute the predicting, determining, and adjusting steps of the method.

DETAILED DESCRIPTION OF EMBODIMENTS

Figure 1:
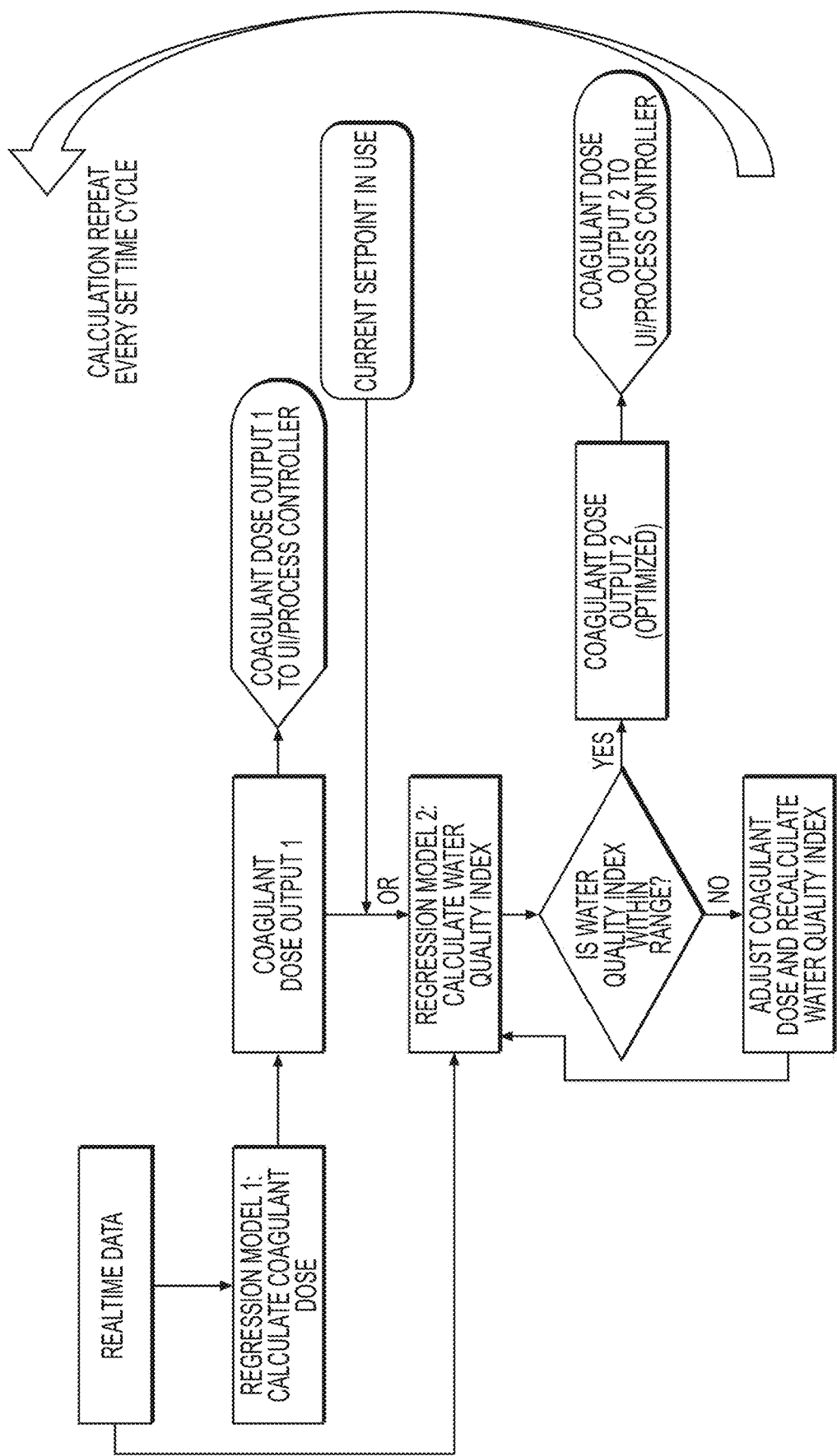
FIG. 1 is a flowchart showing an exemplary feedforward method for determining an optimal coagulant dosage.

In the following description, numerous details are set forth to provide an understanding of the present disclosure. However, it may be understood by those skilled in the art that the methods and systems of the present disclosure may be practiced without these details and that numerous variations or modifications from the described embodiments may be possible.

Disclosed herein are a method, system, and computer readable storage medium for determining an optimal dosage amount of coagulant to be added for coagulation treatment. For example, the disclosed embodiments determine the optimal or smallest effective amount of coagulant for achieving the desired coagulation effect by using machine learning techniques and feed-forward control measurements to build a computational model to predict the treatment result of a given coagulant dosage. In one aspect, a mathematical model, such as a machine learning model, can be constructed to accurately model the coagulation process by taking into account measured raw water parameter(s) and historical data to provide a robust and optimal dosage calculation.

Feedforward Control Method for Determining Optimal Coagulant Dosage

The method includes predicting a water quality index that would be achieved if a nominal coagulant dosage is administered to the water. The water quality index can be any measure of the treated water quality, such as turbidity. The water quality index can be predicted by evaluating the nominal coagulant dosage and at least one measured coagulation-related incoming water parameter of the water with a mathematical model. The mathematical model is constructed from historical data of the water including (i) previously administered coagulant dosages; and (ii) previously determined values of the water quality index of the water that has been treated with the previously administered coagulant dosages. Then, once the water quality index is predicted by using the mathematical model, it is determined whether the predicted water quality index is within a target range. If the predicted water quality index is not within the target range, then the nominal coagulant dosage is adjusted and a sequent water quality index is predicted based on the mathematical model using the adjusted coagulant dosage. This process can be repeated until the predicted water quality index is within the target range. Then, the corresponding coagulant dosage (i.e., either the nominal or an adjusted coagulant dosage, whichever is predicted to achieve the target water quality index) can be administered to the water.

The disclosed methods overcome drawbacks of prior art methods by employing machine learning techniques and feedforward controls to continuously or periodically calculate the optimal dosage for meeting the treatment goal. The disclosed methods use historic dose history and corresponding treatment result, which is compared to the current water quality index goal to determine the optimal dosage. As explained below, the methods have been shown to be effective and can reduce waste and costs as compared to prior methods that administer excess coagulant to the water.

FIG. 1 shows an exemplary flowchart for determining the optimal coagulant dosage using a feedforward methodology. First, data related to the water is collected. For example, real time incoming data can be collected. The data includes at least one measured coagulation-related incoming water parameter of the influent water that has not been treated with the coagulant, and may include any other relevant data collected. The data can be input into Regression Model 2 for predicting a water quality index. A nominal coagulant dosage is also input into Regression Model 2. The nominal dosage may be either a coagulant dose output by Regression Model 1, as discussed in more detail below, or the nominal coagulant dosage may be the current dose set point in use for coagulation treatment. The real time incoming data, including one or more measured values of coagulation-related incoming water parameters of the water, and the nominal coagulant dosage are input into Regression Model 2 to predict a water quality index that would be achieved if the nominal coagulant dosage is administered to the raw, untreated water. The real time incoming data (e.g., coagulation-related incoming water parameter(s)) may be evaluated by Regression Model 1 and/or Regression Model 2 in real time.

Regression Model 2 may be constructed from historical data of the water including at least two of: (i) previously measured value(s) of the coagulation-related incoming water parameter(s) of the raw, untreated water, (ii) previously administered coagulant dosages, and (iii) previously determined values of the water quality index of the water that has been treated with the previously administered coagulant dosages. At least one of the two types of historical data is (iii) the previously determined values of the water quality index of the water. Preferably, Regression Model 2 is constructed from all three (i)—(iii). The model may be constructed by a machine learning algorithm that has been trained using the historical data to identify patterns and relationships in the data for forming a predictive model.

Upon receiving the measured value(s) of the one or more coagulation-related incoming water parameters of the raw water and the nominal or adjusted coagulant dosage, Regression Model 2 can predict the water quality index that would be achieved if the nominal coagulant dosage is administered to the raw water The water quality index is an objective variable that is indicative of the effectiveness of the coagulant. The water quality index may be a measurable parameter of the water that has been treated with the coagulant that is indicative of the amount of coagulation. For instance, the water quality index may be one or more of the pre-filter turbidity, total organic content, ultraviolet absorbance at a wavelength of 254 nm, ultraviolet transmittance at a wavelength of 254 nm, or any other parameter that is indicative of the effectiveness of the coagulant. Thus, the disclosed method predicts how effective a particular coagulant dosage is likely to be by predicting the water quality index that is likely to result if that particular coagulant dosage is administered to the water. In other words, the water quality index is used as an objective variable to evaluate how effective a nominal coagulant dosage is likely to be based on the coagulation-related incoming water parameter(s) of the raw, untreated water and the nominal coagulant dosage.

The coagulation-related incoming water parameter is a measurable parameter of the water that is indicative of a state of the water before the coagulant is administered. For example, the coagulation-related incoming water parameter may be any parameter that is related to or affects the ability of the solid and organic particles and material in the water to coagulate once the coagulant is administered. The coagulation-related incoming water parameter is measured in influent or raw water (e.g., water that has not been treated with the coagulant). The coagulation-related incoming water parameter (also referred to as real time incoming data or a raw water parameter) can be one or more of flow rate, pH, turbidity, conductivity, ultraviolet absorbance at a wavelength of 254 nm, ultraviolet transmittance at a wavelength of 254 nm, total organic carbon, temperature, color, dissolved oxygen, oxidation-reduction potential, suspended solids, surface charge/zeta-potential, particle counter, alkalinity, total hardness, or any other coagulation-related parameter. While the water quality index can be predicted based on a single coagulation-related incoming water parameter, a more robust prediction can be made by evaluating multiple coagulation-related incoming water parameters of the water. Therefore, the method may also include evaluating one, two, three, five, or more coagulation-related parameters of the water.

The method may further include measuring one or more coagulation-related incoming water parameters of the raw, untreated water. For example, the coagulation-related parameter can be measured on-line by a sensor positioned upstream of the coagulant pump (see FIG. 4). The sensor may be a raw water sensor for measuring a coagulation-related parameter of the influent or incoming water. Alternatively, the coagulation-related parameter (e.g., alkalinity and/or total hardness) may be collected as an aliquot and analyzed in a laboratory. The measured coagulation-related parameter(s) can be used as feedforward parameter(s) that is/are input into a controller for predicting the water quality index if a nominal coagulant dosage is administered to the water using Regression Model 2.

After predicting a water quality index that would be achieved if the nominal coagulant dosage is administered to the water by evaluating the coagulation-related parameter(s) measured in the untreated water and the nominal coagulant dosage via Regression Model 2, the method includes determining whether the predicted water quality index is within a target range. As shown in FIG. 1, if the predicted water quality index is within the target range, then the nominal coagulant dosage may be output by the process controller. For example, the process controller can generate control signals to automatically administer the nominal coagulant dosage to the water (e.g., by sending signals to control a pump that pumps the coagulant from a container into the water) or may output instructions to a display or user interface (UI) to instruct an operator of the system to administer the nominal coagulant dosage, or may adjust the nominal coagulant dosage based on feedback controls.

On the other hand, if the predicted water quality index is not within the target range, then the nominal coagulant dosage is adjusted and the adjusted coagulant dosage is input into Regression Model 2 to predict the water quality index that would be achieved if the adjusted coagulant dosage is administered to the water. For example, the target water quality index may be a pre-filter turbidity in a range of from 0.1 to 0.8 NTU, 0.2 to 0.6 NTU, or 0.3 to 0.5 NTU. If the predicted value of the pre-filter turbidity of the treated water (as the water quality index) is higher than the target pre-filter turbidity, then the nominal coagulant dosage can be expected to provide insufficient coagulation and flocculation, as well as diminished sedimentation efficiency and shorter filter run times. In this case, the processor increases the nominal coagulant dosage, and then evaluates the increased nominal coagulant dosage, along with the coagulation-related parameter(s) of the untreated water via Regression Model 2 to predict the water quality index that would be achieved if the increased coagulant dosage is administered to the untreated water.

On the other hand, if the predicted value of the pre-filter turbidity of the treated water (as the water quality index) is lower than the target pre-filter turbidity, then the nominal coagulant dosage is predicted to be excessive, which can unnecessarily increase costs. In this case, the processor decreases the nominal coagulant dosage, and then evaluates the decreased nominal coagulant dosage, along with the coagulation-related parameter(s) of the untreated water via Regression Model 2 to predict the water quality index that would be achieved if the decreased coagulant dosage is administered to the untreated water. In other words, as shown in FIG. 1, the adjusted coagulant dosage (which is increased or decreased relative to the nominal coagulant dosage first evaluated) is evaluated along with the one or more coagulation-related parameters of the untreated water to predict a new water quality index that would be achieved if the adjusted coagulant dosage is administered to the untreated water.

The newly predicted water quality index based on the adjusted coagulant dosage is then evaluated to determine whether it is within the target range. If the newly predicted water quality index is within the target range, then the adjusted coagulant dosage is output by the process controller, e.g., as a signal to control process equipment, or to a display or user interface that is operated by a user. If the newly predicted water quality index is not within the target range, then the adjusted coagulant dosage is adjusted again and the process is repeated to predict a new water quality index. The method may include incrementally adjusting the nominal coagulant dosage, and repeating the predicting and determining steps until the predicted water quality index is determined to be within the target range. Once the predicted water quality index is within the target range, then the coagulant dosage (i.e., either the nominal coagulant dosage or an adjusted coagulant dosage) may be output for further action, such as administering the coagulant dosage (i.e., either the nominal coagulant dosage or an adjusted coagulant dosage, whichever is predicted to achieve a water quality index within the target range) to the water, instructing a user to administer the coagulant dosage to the water, or further processing and/or adjusting of the coagulant dosage, for example, based on feedback controls or the like.

As shown in FIG. 1, the method may further include calculating the nominal coagulant dosage based on measured values of one or more coagulation-related incoming water parameters of the raw, untreated water. Preferably, the nominal coagulant dosage is calculated based on more than one coagulation-related incoming water parameter for a more robust calculation. The coagulant dosage may be calculated by evaluating the real time data, including the measured coagulation-related parameter(s) of the raw, untreated water using Regression Model 1. Regression Model 1 is a mathematical model constructed from historical data of the water including (i) previously measured values of the coagulation-related incoming water parameters of the water that has not been treated with the coagulant; and (ii) previously administered coagulant dosages. The mathematical model may be constructed by a machine learning algorithm that has been trained using the historical data to identify patterns and relationships in the data, for example, between the previously measured coagulation-related parameters and the previously administered coagulant dosages. Upon receiving the measured value(s) of the one or more coagulation-related parameters of the raw water, Regression Model 1 can calculate the coagulant dosage that the controller would have administered in the past based on the measured value(s) of the coagulation-related parameters(s).

The calculated coagulant dosage may then be input into Regression Model 2 as the nominal coagulant dosage for determining the optimal coagulant dosage predicted to achieve the target water quality index. Alternatively, as shown in FIG. 1, the coagulant dosage calculated by Regression Model 1 may be output by the process controller (e.g., as a signal to control process equipment) or may be output to the user interface to instruct an operator of the system to administer the nominal coagulant dosage.

As shown in FIG. 1, the process for determining the optimal coagulant dosage by predicting the water quality index via Regression Model 2 and/or calculating the nominal coagulant dosage via Regression Model 1 can be repeated at set time cycles. For instance, real time data may be repeatedly collected by the process controller for evaluation using Regression Model 1 and/or Regression Model 2 to determine the optimal coagulant dosage every minute, 5 minutes, 15 minutes, 30 minutes, or hour. Alternatively, if the state of the water (e.g., real time incoming data) is relatively stable, then the process may be repeated at longer intervals, such as once or twice a day.

Mathematical Model Training

Figure 2:
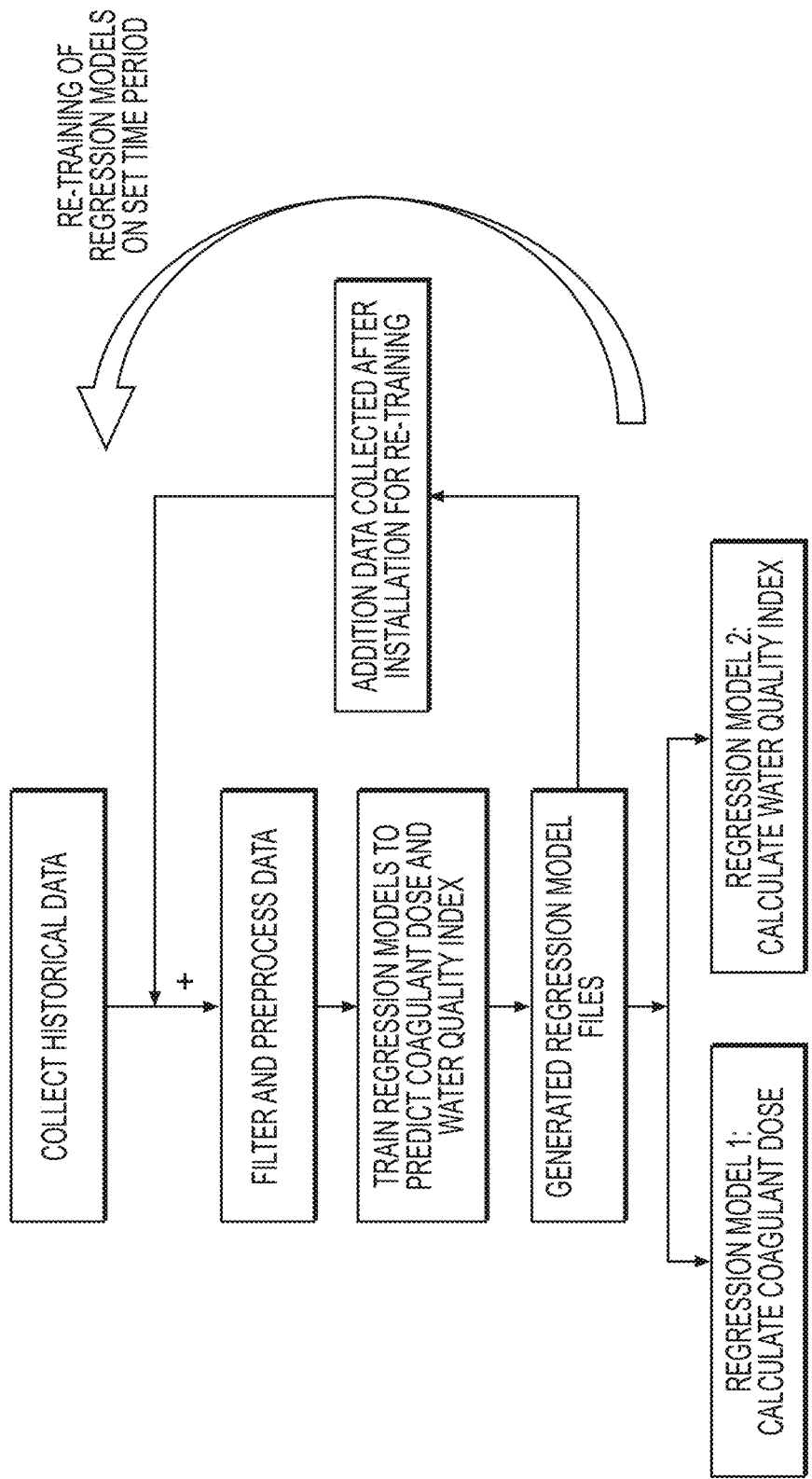
FIG. 2 is a flowchart showing an exemplary algorithm for training first and second regression models for calculating the coagulant dosage and predicting the water quality index, respectively.

FIG. 2 shows an exemplary algorithm for constructing and training the mathematical models. Regression Models 1 and 2 may be respectively constructed from a first machine learning algorithm and a second machine learning algorithm. The machine learning models can be single- or multi-variable regression models that are trained to provide a robust and optimal dosage calculation by taking into account one or several explanatory variables, including the coagulation-related incoming water parameter(s) and any other raw water parameters, and the treatment goal or objective variable (e.g., water quality index within the target range).

To train the models, historical data is first collected and stored, as shown in FIG. 2. The historical data includes historical measurements (performed on-line and/or in a laboratory) of the coagulation-related incoming water parameter(s) of raw, untreated water, historical coagulant dosages administered to the raw, untreated water, and historical values of the water quality index achieved after the coagulant was administered. The historical data can also include any other data related to the water that has been collected. The historical data can be collected over any prior period of time, such as 30 days to 5 years, 2 months to 2 years, or 6 months to 1 year. As shown in FIG. 2, once the historical data is collected, the data is filtered and preprocessed, e.g., to remove outliers according to known methods. A dataset including, for example, one or more of a training dataset, validation dataset, and test dataset, can then be prepared from the historical data and stored in the memory.

The training dataset can be fit to the regression models to (i) calculate the nominal coagulation dosage based one or more coagulation-related parameters of the raw water (Regression Model 1), and (ii) predict the water quality index based on the one or more coagulation-related parameters of the raw water and the nominal coagulant dosage (Regression Model 2). For example, the models can be trained on the training dataset to infer patterns and relationships between the explanatory variables (e.g., the historical coagulation-related parameters and the historical coagulant dosages) and the objective variable(s) (e.g., historical water quality indices) to form predictive models for predicting the coagulant dosage and water quality index.

For example, Regression Model 1 may identify patterns and/or relationships in the historical data between the historical coagulation-related incoming water parameters of the raw water and the corresponding historical coagulant dosages administered to the raw water to develop an algorithm for predicting the coagulant dosage that would have been administered in the past based on real time measured value(s) of the coagulation-related incoming water parameter(s) of the raw water. Regression Model 2 may identify patterns and/or relationships in the historical data between at least two of: (i) the historical coagulation-related incoming water parameters of the raw water, (ii) the corresponding historical coagulant dosages administered to the raw water, and (iii) the resulting historical water quality indices achieved by administering the historical coagulant dosages to the raw water, at least one of which is (iii) the historical water quality indices, to develop an algorithm for predicting the water quality index that would be achieved if a nominal coagulant dosage is administered to the raw water based on real time measured value(s) of the coagulation-related parameter(s) of the raw water. Preferably, Regression Model 2 identifies patterns and relationships in the historical data between all three (i)—(iii).

The learning methodology (e.g., supervised learning) may involve any suitable machine learning regression method, such as Linear Regression, Gradient Boosting Regression, Quadent, decision tree, Gradient Boosting Decision Tree (GBDT)/Gradient Boosting Decision Tree (GBRT)/Multiple Addition Regression Tree (MART), Artificial Neural Network (ANN), Convolutional Neural Network (CNN), and Recurrent Neural Network (RNN).

The fitted models can then be validated by using the models to predict the coagulant dosage that would have been administered in the past based on the historical data (Regression Model 1) and the water quality index that would be achieved if a nominal coagulant dosage is administered to the water (Regression Model 2) in a validation dataset. The validation process can be used to further tune the fitted models for accurately predicting the coagulant dosage and water quality index. Once the models have been validated, a test dataset can be used to evaluate the final models fit on the training dataset. During the training, validation, and/or testing phases, the models can self-learn based on the historical data and adjust their algorithms, for example, to add new explanatory variables or make any other adjustment, to improve the accuracy of their predictions. With reference to FIG. 2, once trained and validated, the regression model files are generated and stored, for example, in memory, and the trained models can then be used (e.g., by the controller) to evaluate real time data to calculate the coagulant dosage and predict the water quality index.

The programmatic tools used in developing the disclosed machine learning algorithms are not particularly limited and may include, but are not limited to, open source tools, such as Python open source machine learning libraries, rule engines such as Hadoop®, programming languages including Python, SAS®, SQL, R, and various relational database architectures.

As shown in FIG. 2, Regression Models 1 and 2 can be retrained based on new data collected and evaluated by the models to calculate the nominal coagulant value and/or predict the water quality index. For example, the models may be periodically retrained on a set time interval, such as weekly, monthly, or annually, or any other suitable interval. For instance, Regression Models 1 and 2 can be retained every 30 days based on real time data collected during the preceding 30 days (or other set time interval). The collected data can be filtered and preprocessed and added to a stored dataset, such as one or more of the training, validation, and/or test datasets, or a new dataset for retaining. Then, Regression Models 1 and 2 can be retrained based on the updated and/or new dataset(s). During retraining, the Regression Models self-learn and update their algorithms and/or add new explanatory variables based on the updated/new dataset(s). By periodically retraining the models, their predictive accuracy can be further improved over time.

Figure 3:
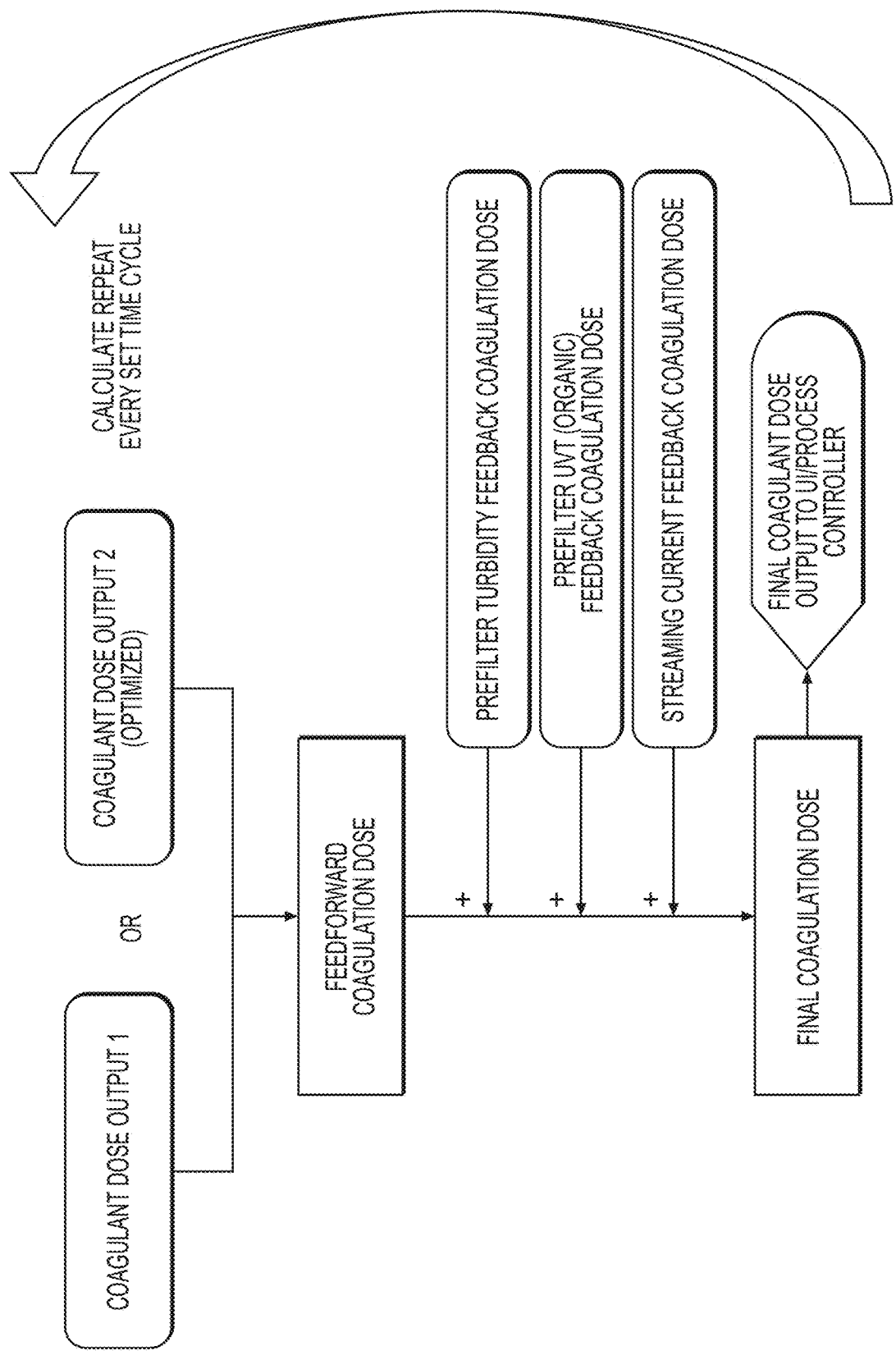
FIG. 3 is a flowchart showing an exemplary method for determining an optimal coagulant dosage by using feedforward and feedback controls.

Feedforward and Feedback Control Method for Determining Optimal Coagulant Dosage FIG. 3 shows a flowchart for an exemplary methodology for determining the final coagulant dosage using both feedforward and feedback controls. The methodology in FIG. 3 includes the feedforward methodology shown in FIG. 1 for calculating the coagulant dosage output 1 by Regression Model 1 and/or calculating the optimal coagulant dose output 2 based on the water quality index predicted by Regression Model 2. As shown in FIG. 3, the feedforward dosage output by the feedforward model can be further adjusted by feedback control loops. The feedback control loops can include collecting data (e.g., real time data) indicative of the effectiveness of the coagulant dosage, and adjusting the coagulant dosage based on the collected data. The feedback parameters shown in FIG. 3 include measuring pre-filter turbidity, pre-filter UVT (e.g., organic content based on UV absorbance/transmittance at a wavelength of 254 nm), and streaming current in the water that has been treated with the coagulant dosage. The feedback parameters may include fewer or more than those illustrated in FIG. 3. For example, the feedback parameters may additionally or alternatively include one or more of streaming current, particle scatter, ultraviolet absorbance at a wavelength of 254 nm, ultraviolet transmittance at a wavelength of 254 nm, pH, total organic carbon, and pre-filter turbidity.

Figure 4:
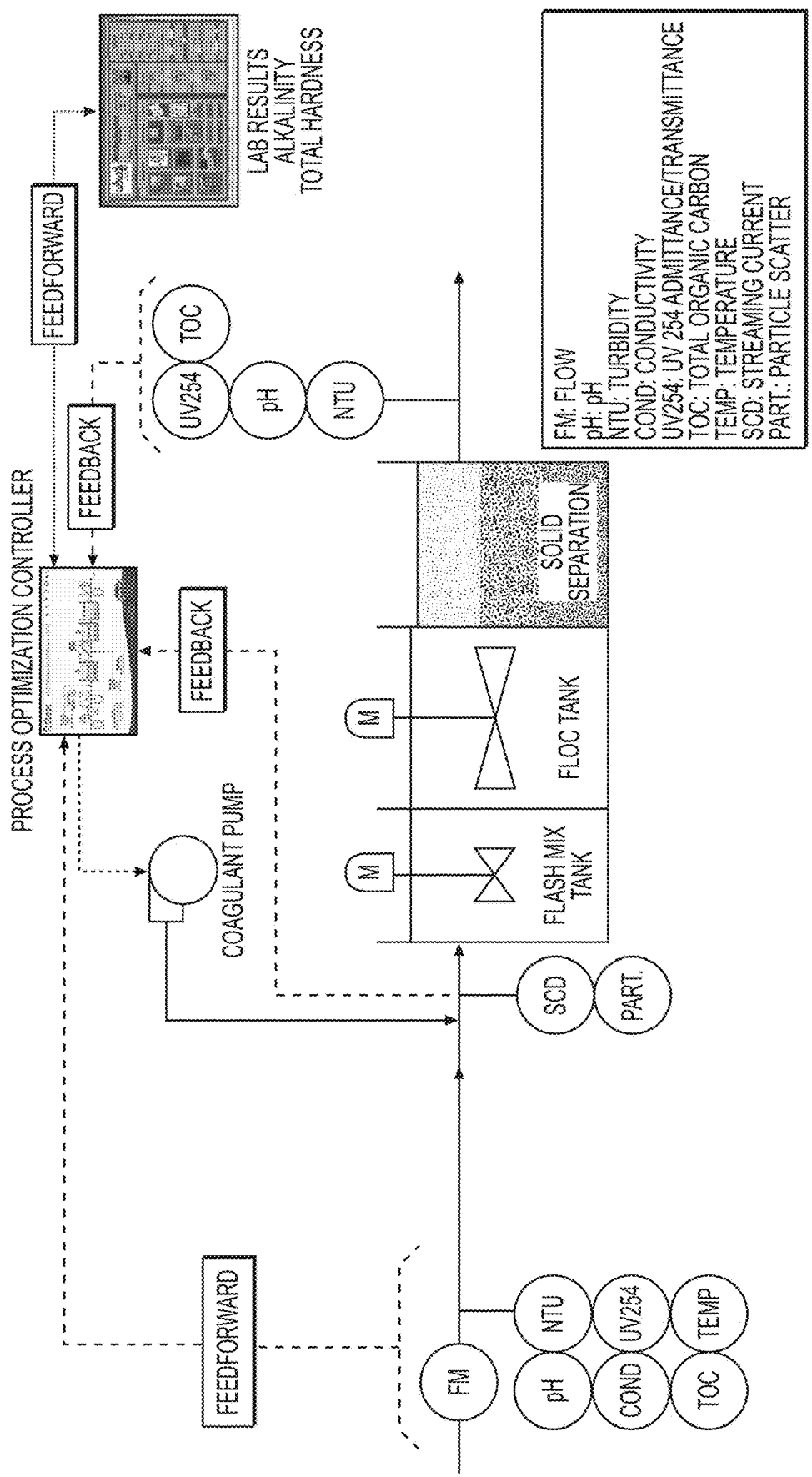
FIG. 4 is a schematic diagram of an exemplary coagulation system.

The feedback parameter(s) can be measured on-line downstream of the coagulant pump and/or upstream of a filter, or in a laboratory. For example, with reference to FIG. 4, the feedback sensor(s) may include the streaming current SCD, particle scatter PART, UV absorbance/transmittance at 254 nm UV254, total organic carbon TOC, pH, and pre-filter turbidity NTU. In FIG. 4, the feedback sensor(s) are positioned on-line downstream of the coagulant pump and either upstream (e.g., SCD and PART) or downstream (e.g., UV254, TOC, pH, and NTU) of the solids separation tank. However, the feedback sensor(s) may be positioned anywhere downstream of the coagulant pump for measuring the feedback parameters, and/or upstream of a filter (not shown) downstream of the solids separation tank.

The measured feedback parameter(s) can be evaluated to adjust the coagulant dosage accordingly. For example, the process controller, which is configured to receive the measured feedback parameter(s), can be configured to evaluate the measured parameters and adjust the coagulant dosage accordingly. Alternatively, another processor can be used to evaluate the measured feedback parameter(s) and adjust the coagulant dosage. The final coagulant dosage can then be output to the processor controller for automatically controlling the coagulant pump to administer the final coagulant dosage or outputting instructions to a user (e.g., via a user interface) to adjust the coagulant dosage.

Verification and adjustment of the feed-forward model can be continuously or periodically performed using the real time feedback measurement(s). Alternatively, if, for example, continuous on-line feedback measurements are not available, laboratory analysis of grab samples collected as an aliquot can be used as a soft sensor for intermittent verification and adjustment of the feedforward model. If continuous on-line surrogate parameter feedback measurements are available for variables other than the explanatory variables, a regression model using the surrogate on-line parameter can be used to predict (forecast) an explanatory variable result for model verification and adjustment.

When the coagulant dosage (e.g., the feedforward dosage) is adjusted based on the feedback controls, this result is stored with the other data collected by the controller, and can be used to retrain Regression Models 1 and 2. For example, during retraining, the adjustments made by the feedback controls can be filtered and processed and added to the training dataset along with the other data collected since the last training. The models can self-learn from the adjustments made to the coagulant dosage based on the feedback controls to adjust their algorithm and/or identify new explanatory variables to further improve the predictive accuracy of the models in determining the optimal concentration. The combination of feedforward and feedback controls can accurately model the coagulation process for precisely calculating the optimal coagulant dosage for reducing waste and costs and improving efficiency.

Coagulation Treatment System and Computer Readable Storage Medium

The present disclosure also relates to a coagulation treatment system. An exemplary system is illustrated in FIG. 4, in which water flows through a conduit in a direction from the left-hand side to the right-hand side of the figure. A plurality of sensors for measuring one or more the coagulation-related incoming water parameters of the influent (e.g., raw, untreated) water are positioned (e.g., installed) on-line at a position upstream of the coagulant pump. The sensors may include a flow rate sensor (FM), turbidity sensor (NTU), conductivity sensor (COND), an ultraviolet absorbance/transmittance sensor at a wavelength of 254 nm (UV254), total organic carbon sensor (TOC), and temperature sensor (TEMP). The system is not limited to these sensors, and can include one or more of these sensors. For example, the system may additionally or alternatively include sensors not shown in FIG. 4, such as a color sensor, dissolved oxygen sensor, oxidation-reduction potential (ORP) sensor, and/or any other suitable sensor for measuring a coagulation-related parameter of the water. In addition to the on-line sensors, other coagulation-related parameters (e.g., alkalinity and/or total hardness) may be measured in a laboratory.

The system further includes a coagulant pump for pumping the coagulant into the raw water. The coagulant pump may be any suitable pump or injector for administering the coagulant to the raw water at the determined dosage. The coagulant is pumped into the water upstream of any flash mix tank, flocculation (floc) tank, and solids separation tank in FIG. 4, but may be administered to the water at any suitable position. The coagulant used in the methods and systems disclosed herein may be any suitable coagulant or coagulation aid for achieving coagulation and/or flocculation of particulate matter in the water. For example, the coagulant may be one or more of the following but not limited to aluminum sulfate (Alum), ferric chloride, ferric sulfate, polyaluminum chloride (PAC), and organic anionic/cationic polymers. The coagulant can be administered to the water continuously, intermittently, or periodically. The coagulant dosing schedule may be stored in the memory.

With continuing reference to FIG. 4, the system may include a flash mix tank downstream of the coagulant pump for agitating and mixing the water and coagulant in a flash mixing process. The flash mix tank can be immediately downstream of the coagulant pump for rapidly mixing the coagulant and water to disperse the coagulant throughout the water stream and blend the mixture uniformly. A flocculation tank can also or alternatively be provided. The flocculation tank can provide gentle agitation or slow mixing (e.g., relative to any flash mix tank) to promote particle collisions and enhance floc growth. Downstream of the coagulation mixing is a solids separation tank, which allows the suspended particles and flocs to settle out of the water as it flows through the tank. A layer of accumulated solids, known as sludge, forms at the bottom of the tank and can be periodically removed. Downstream of the solids separation tank is a filter (not shown) for further removing impurities from the water, for example, by filtering the water through a layer or bed of porous, granular material, such as sand or carbon. The water system is not limited to the embodiment illustrated in FIG. 4. For example, the system may include any combination of known tanks for coagulation and/or flocculation, which may include fewer or more tanks than those shown in FIG. 4. For example, the system may additionally or alternatively include a Dissolved Air Flotation (DAF) tank for removing suspended matter.

As shown in FIG. 4, the system further includes a process optimization controller that is configured to receive data (e.g., real time data) from the one or more on-line sensors and/or laboratory data (including data for both feedforward and feedback parameters). The process controller can be configured to evaluate the data input from the on-line sensors and/or laboratory to determine the optimal coagulant dosage using any of the methodologies disclosed herein. For example, the processor controller can be configured to implement the feedforward control model illustrated in FIG. 1, including Regression Models 1 and/or 2, for determining the optimal coagulant dosage by predicting the water quality index that would be achieved by administering a nominal coagulant dosage, and/or calculating the nominal or adjusted coagulant dosage, and/or the feedforward/feedback control method illustrated in FIG. 3 for determining the final coagulant dosage. The process controller can be further configured to control the coagulant pump to administer the coagulant dosage determined by the feedforward and/or feedback control methodologies. Alternatively, the water system may have another dedicated controller for controlling the coagulant pump, including dosage amount and schedule. The process controller can output the determined optimal coagulant dosage, e.g., as a control signal, to the dedicated controller for controlling the coagulant pump. The process controller may alternatively or additionally be configured to output the coagulant dosage determined by any of the methodologies disclosed herein to an operator of the system, for example, via a user interface such that the user can manually operate the coagulant pump to administer the determined coagulant dosage to the water. The controller may further be configured to receive instructions from a user (e.g., via the user interface). For example, a user may input the nominal coagulant dosage to the controller for analysis via Regression Model 1 and/or 2, or may instruct the controller to otherwise adjust the coagulant dosage.

The process controller may be configured to execute various software programs, including software performing all or part of the processes and algorithms disclosed herein. For example, the process controller may be configured to process data, such as feedforward and/or feedback data, for machine learning and other algorithms and software programs in order to output a value for a parameter (e.g., nominal coagulant dosage, water quality index, and final coagulant dosage). As an example, the controller can include a processor, memory operatively coupled to the processor, and one or more modules and/or machine learning algorithms stored in the memory that include processor-executable instructions to instruct the controller to process input values for a set of parameters associated with operations of the coagulation treatment system (e.g., measured raw water coagulation-related parameter(s), nominal coagulant dosage, and measured feedback parameters) using feedforward and/or feedback models, including trained mathematical (machine learning) models, such as Regression Models 1 and/or 2, to output a value for an objective parameter (e.g., nominal coagulant dosage, water quality index, and final coagulant dosage); and to control at least one of the operations of the water treatment system based at least in part on the output value. The instructions can instruct the controller to control dosage of the coagulant, or to control an interface or the like to allow a user to administer the determined coagulant dosage. The memory can be further configured to store the real time data collected from the on-line sensors and laboratory, the training, validation, and/or test datasets, as well as any other data.

The process controller includes hardware, such as a circuit for processing digital signals and a circuit for processing analog signals, for example. The controller may include one or a plurality of circuit devices (e.g., an IC) or one or a plurality of circuit elements (e.g., a resistor, a capacitor) on a circuit board, for example. The controller may be a central processing unit (CPU) or any other suitable processor. The process controller may be or form part of a specialized or general purpose computer or processing system that may implement machine learning algorithms according to disclosed embodiments. One or more controllers, processors, or processing units, memory, and a bus that operatively couples various components, including the memory to the controller, may be used. The controller may include a module that performs the methods described herein. The module may be programmed into the integrated circuits of the processor, or loaded from memory, storage device, or network or combinations thereof. For example, the controller may execute operating and other system instructions, along with software algorithms, machine learning algorithms, computer-executable instructions, and processing functions of the coagulation treatment system.

The process controller may be operational with numerous other general purpose or special purpose computing system environments or configurations. Examples of well-known computing systems, environments, and/or configurations that may be suitable for use with the disclosed embodiments may include, but are not limited to, personal computer systems, server computer systems, thin clients, thick clients, handheld devices, such as tablets and mobile devices, laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The various components of the water treatment system may be connected with each other via any type of digital data communication such as a communication network. Data may also be provided to the process controller through a network device, such as a wired or wireless Ethernet card, a wireless network adapter, or any other device designed to facilitate communication with other devices through a network. The network may be, for example, a Local Area Network (LAN), Wide Area Network (WAN), and computers and networks which form the Internet. The system may exchange data and communicate with other systems through the network. For example, the method may be practiced in clouding computing environments, including public, private, and hybrid clouds. The method can also or alternatively be practiced in distributed cloud computing environments where tasks are performed by remote processing devices that are linked through a communications network. In a distributed cloud computing environment, program modules may be located in both local and remote computer system storage media including memory storage devices. The system may be also be configured to work offline.

The present disclosure further relates to a non-transitory computer-readable storage medium configured to store a computer-executable program that causes a computer to perform functions, such as those for implementing the disclosed methods. For example, the computer-executable functions can include processing real time incoming data collected by the controller, calculating a coagulant dosage by evaluating at least one measured coagulation-related parameter of the untreated water with Regression Model 1, and predicting a water quality index that would be achieved if a nominal coagulant dosage is administered to the water by evaluating the nominal coagulant dosage and at least one coagulation-related parameter of the water that has not been treated with a coagulant Regression Model 2, determining whether the predicted water quality index is within a target range, and if the predicted water quality index is not within the target range, adjusting the nominal coagulant dosage and predicting, based on Regression Model 2, the water quality index that would be achieved if the adjusted coagulant dosage is administered to the water. The computer-executable functions may also include functions related to the feedback control methodologies, as well as controlling the coagulant pump to administer the coagulant at the indicated dosage and/or outputting instructions to a user (e.g., via a user interface), for example, regarding the coagulant dosage, and any other function related to the disclosed methods. The computer-readable storage medium may further store the real time data collected by the controller, one or more of training, validation, and test data sets, as well as machine learning algorithms and computer-executable instructions.

The storage medium may include a memory and/or any other storage device. The memory may be, for example, random-access memory (RAM) of a computer. The memory may be a semiconductor memory such as an SRAM and a DRAM. The storage device may be, for example, a register, a magnetic storage device such as a hard disk device, an optical storage device such as an optical disk device, an internal or external hard drive, a server, a solid-state storage device, CD-ROM, DVD, other optical or magnetic disk storage, or other storage devices.

The methods, systems, computer readable storage medium, and computer programs and machine learning algorithms disclosed herein can be integrated into existing water and/or coagulation treatment systems and infrastructure so as to modify the existing systems to calculate the optimal coagulant dosage according to the methodologies disclosed herein.

It will be appreciated that the above-disclosed features and functions, or alternatives thereof, may be desirably combined into different methods and systems. Also, various alternatives, modifications, variations or improvements may be subsequently made by those skilled in the art, and are also intended to be encompassed by the disclosed embodiments. As such, various changes may be made without departing from the spirit and scope of this disclosure.

What is claimed is:

1. A method for determining an optimal amount of a coagulant to be administered to water in a coagulation treatment system, the method comprising:
   calculating a nominal coagulant dosage based on a plurality of coagulation-related incoming water parameters by evaluating the plurality of coagulation-related incoming water parameters with a first mathematical model that has been trained using historical data including (i) previously measured values of the plurality of coagulation-related incoming water parameters, and (ii) previously administered coagulant dosages;
   predicting a water quality index for the nominal coagulant dosage by inputting the nominal coagulant dosage into a second mathematical model and evaluating at least one coagulation-related incoming water parameter via the second mathematical model, wherein the second mathematical model has been trained using historical data of the water including (i) the previously administered coagulant dosages, and (ii) previously determined values of the water quality index of the water that has been treated with the previously administered coagulant dosages;
   determining whether the predicted water quality index for the nominal coagulant dosage is within a target range;
   when the predicted water quality index is not within the target range, adjusting the nominal coagulant dosage and predicting, via the second mathematical model, a water quality index for the adjusted coagulant dosage; and
   when the predicted water quality index is within the target range, administering the nominal coagulant dosage to the water.

2. The method of claim 1, wherein the predicted water quality index for the nominal coagulant dosage is within the target range, and the nominal coagulant dosage is administered.

3. The method of claim 1, wherein adjusting the nominal coagulant dosage and predicting the water quality index for the adjusted coagulant dosage comprises:
   incrementally adjusting the nominal coagulant dosage;
   repeating the predicting and determining steps until the predicted water quality index is within the target range; and
   administering the adjusted coagulant dosage to the water.

4. The method of claim 1, wherein:
   the historical data of the water further includes previously measured coagulation-related incoming water parameters; and
   the second mathematical model is machine learning model that has been trained using the historical data to identify relationships between the previously measured coagulation-related incoming water parameters, the previously administered coagulant dosages, and the previously determined values of the water quality index.

5. The method of claim 1, wherein the first mathematical model is a multivariable regression model constructed by a machine learning algorithm that has been trained using the historical data to identify relationships between the previously measured values of the plurality of coagulation-related incoming water parameters and the previously administered coagulant dosages.

6. The method of claim 1, further comprising periodically retraining one or both of the first mathematical model and second mathematical model based on new data collected.

7. The method of claim 1, wherein:
   the at least one coagulation-related incoming water parameter is selected from the group consisting of flow rate, pH, turbidity, conductivity, ultraviolet absorbance at a wavelength of 254 nm, ultraviolet transmittance at a wavelength of 254 nm, total organic carbon, temperature, color, dissolved oxygen, oxidation-reduction potential, alkalinity, and total hardness, and
   the water quality index is at least one selected from the group consisting of pre-filter turbidity, total organic content, ultraviolet absorbance at a wavelength of 254 nm, and ultraviolet transmittance at a wavelength of 254 nm.

8. The method of claim 1, further comprising adjusting the nominal coagulant dosage based on a feedback parameter measured downstream from a coagulant injector, wherein the feedback parameter is at least one selected from the group consisting of streaming current, particle scatter, ultraviolet absorbance at a wavelength of 254 nm, ultraviolet transmittance at a wavelength of 254 nm, pH, total organic carbon, and pre-filter turbidity.

9. A coagulation treatment system comprising:
   a conduit configured to have water flow therethrough;
   a memory configured to store at least a first mathematical model that has been trained using historical data including (i) previously measured values of a plurality of coagulation-related incoming water parameters, and (ii) previously administered coagulant dosages, and a second mathematical model trained using historical data of the water including (i) the previously administered coagulant dosages, and (ii) previously determined values of a water quality index of the water that has been treated with the previously administered coagulant dosages; and a controller configured to:
calculate a nominal coagulant dosage by evaluating, via the first mathematical model, a plurality of coagulation-related incoming water parameters;
predict a water quality index for the nominal coagulant dosage by inputting the nominal coagulant dosage into the second mathematical model and evaluating, based on the first-second mathematical model, at least one coagulation-related incoming water parameter;
determine whether the predicted water quality index for the nominal coagulant dosage is within a target range; and
when the predicted water quality index is not within the target range, adjust the nominal coagulant dosage and predict, based on the second mathematical model, a water quality index for the adjusted coagulant dosage.

10. The coagulation treatment system of claim 9, further comprising:
a raw water sensor configured to measure the at least one coagulation-related incoming water parameter, and
a coagulant injector configured to administer the coagulant to the water, wherein the coagulant injector is positioned downstream of the raw water sensor.

11. The coagulation treatment system of claim 9, further comprising a feedback sensor configured to measure a feedback parameter of the water that has been treated with the coagulant, the feedback sensor being positioned downstream of a coagulant injector,
wherein:
the feedback parameter is at least one selected from the group consisting of streaming current, particle scatter, ultraviolet absorbance at a wavelength of 254 nm, ultraviolet transmittance at a wavelength of 254 nm, pH, total organic carbon, and pre-filter turbidity; and
the controller is further configured to adjust the coagulant dosage administered to the water based on the feedback parameter measured downstream of the coagulant injector.

12. A non-transitory computer readable storage medium having stored therein a program to be executable by a processor, the program causing the processor to execute:
calculating a nominal coagulant dosage based on a plurality of coagulation-related incoming water parameters by evaluating the plurality of coagulation-related incoming water parameters with a first mathematical model that has been trained using historical data including (i) previously measured values of the plurality of coagulation-related incoming water parameters, and (ii) previously administered coagulant dosages; and
predicting a water quality index for the nominal coagulant dosage by inputting the nominal coagulant dosage into a second mathematical model and evaluating at least one coagulation-related incoming water parameter via the second mathematical model, wherein the second mathematical model has been trained using historical data including (i) the previously administered coagulant dosages, and (ii) previously determined values of the water quality index of the water that has been treated with the previously administered coagulant dosages;
determining whether the predicted water quality index for the nominal coagulant dosage is within a target range;
when the predicted water quality index is not within the target range, adjusting the nominal coagulant dosage and predicting, via the second mathematical model, a water quality index for the adjusted coagulant dosage; and
when the predicted water quality index is within the target range, outputting instructions to administer the nominal coagulant dosage to the water.

13. The non-transitory computer readable storage medium according to claim 12, wherein the predicted water quality index for the nominal coagulant dosage is within the target range, and the program causes the processor to further execute:
outputting instructions to administer the nominal coagulant dosage to the water.

14. The non-transitory computer readable storage medium according to claim 12, wherein adjusting the nominal coagulant dosage and predicting the water quality index for the adjusted coagulant dosage comprises:
incrementally adjusting the nominal coagulant dosage;
repeating the predicting and determining steps until the predicted water quality index is within the target range; and
outputting instructions to administer the adjusted coagulant dosage to the water.

15. The non-transitory computer readable storage medium according to claim 12, wherein
the at least one coagulation-related incoming water parameter is selected from the group consisting of flow rate, pH, turbidity, conductivity, ultraviolet absorbance at a wavelength of 254 nm, ultraviolet transmittance at a wavelength of 254 nm, total organic carbon, temperature, color, dissolved oxygen, oxidation-reduction potential, alkalinity, and total hardness, and
the water quality index is at least one selected from the group consisting of pre-filter turbidity, total organic content, ultraviolet absorbance at a wavelength of 254 nm, and ultraviolet transmittance at a wavelength of 254 nm.

16. The non-transitory computer readable storage medium according to claim 12, wherein the program causes the processor to further execute:
adjusting the nominal coagulant dosage based on a feedback parameter measured downstream from a coagulant injector, wherein the feedback parameter is at least one selected from the group consisting of streaming current, particle scatter, ultraviolet absorbance at a wavelength of 254 nm, ultraviolet transmittance at a wavelength of 254 nm, pH, total organic carbon, and pre-filter turbidity.

* * * * *